(12) United States Patent
Kim et al.

(10) Patent No.: US 9,043,460 B1
(45) Date of Patent: May 26, 2015

(54) DISTRIBUTED MANAGEMENT WITH EMBEDDED AGENTS IN ENTERPRISE APPS

(71) Applicant: MOBILE IRON, INC., Mountain View, CA (US)

(72) Inventors: Mansu Kim, Cupertino, CA (US); Suresh Kumar Batchu, Milpitas, CA (US); Joshua Sirota, Los Altos, CA (US)

(73) Assignee: MOBILE IRON, INC., Mountain View, CA (US)

( * ) Notice: Subject to any disclaimer, the term of this patent is extended or adjusted under 35 U.S.C. 154(b) by 0 days.

(21) Appl. No.: 14/195,716

(22) Filed: Mar. 3, 2014

Related U.S. Application Data

(60) Provisional application No. 61/771,491, filed on Mar. 1, 2013.

(51) Int. Cl.
*G06F 17/30* (2006.01)
*H04W 8/22* (2009.01)
*H04L 29/06* (2006.01)
*H04L 29/08* (2006.01)

(52) U.S. Cl.
CPC ............... *H04W 8/22* (2013.01); *H04L 29/06* (2013.01); *H04L 29/08072* (2013.01); *H04L 29/06027* (2013.01)

(58) Field of Classification Search
CPC ......... H04L 29/06; H04L 67/04; H04L 67/10; H04L 67/12; H04L 67/16; H04L 67/18; H04L 67/28; H04L 67/34; H04L 67/104; H04L 67/1044; H04L 67/1046; H04L 67/1048; H04L 67/1068; H04L 67/108; H04L 67/125; H04L 51/30; H04L 69/329; G06Q 30/02
USPC ................. 709/224; 707/10, 999.01; 370/352
See application file for complete search history.

(56) References Cited

U.S. PATENT DOCUMENTS

2003/0084010 A1* 5/2003 Bigus et al. ................. 706/6
2005/0256876 A1* 11/2005 Eidson ......................... 707/10
2007/0237133 A1* 10/2007 Woods et al. ............... 370/352

* cited by examiner

*Primary Examiner* — Kyung H Shin
(74) *Attorney, Agent, or Firm* — Van Pelt, Yi & James LLP

(57) ABSTRACT

Distributed mobile device management including a plurality of management agents is disclosed. Management-related information may be retrieved from a storage location accessible to a plurality of management agents. The management-related information may have been provided to the storage location from a management agent associated with a managed application. And at least one operation may be performed based at least in part on the management-related information.

20 Claims, 7 Drawing Sheets

DISTRIBUTED MANAGEMENT WITH EMBEDDED AGENTS IN ENTERPRISE APPS

CROSS REFERENCE TO OTHER APPLICATIONS

This application claims priority to U.S. Provisional Patent Application No. 61/771,491 entitled DISTRIBUTED MANAGEMENT WITH EMBEDDED AGENTS IN ENTERPRISE APPS filed Mar. 1, 2013, which is incorporated herein by reference for all purposes.

BACKGROUND OF THE INVENTION

Many mobile devices (e.g., enterprise-related mobile devices) are managed using mobile device management (MDM) approaches. Typically, a mobile device operating in an MDM environment may include managed application(s) that are managed by a management agent application. The management agent may operate in conjunction with a management server (e.g., security management platform) and/or other components. For example, the management server may identify a management agent on the device. Once identified, the management server may communicate management commands, retrieve inventory information for the device, and perform other operations in conjunction with management agent.

Typically, a single management agent application is included on a mobile device. In the event a single management agent is removed from a device or is not running, the enterprise may lose the ability to manage the device. Under such conditions, enterprise content may be accessed by an unauthorized user or app and/or leaked out of the mobile device. And an employee may not be able to use managed applications (e.g., enterprise applications) until the management agent is restored.

BRIEF DESCRIPTION OF THE DRAWINGS

Various embodiments of the invention are disclosed in the following detailed description and the accompanying drawings.

DETAILED DESCRIPTION

Figure 1:
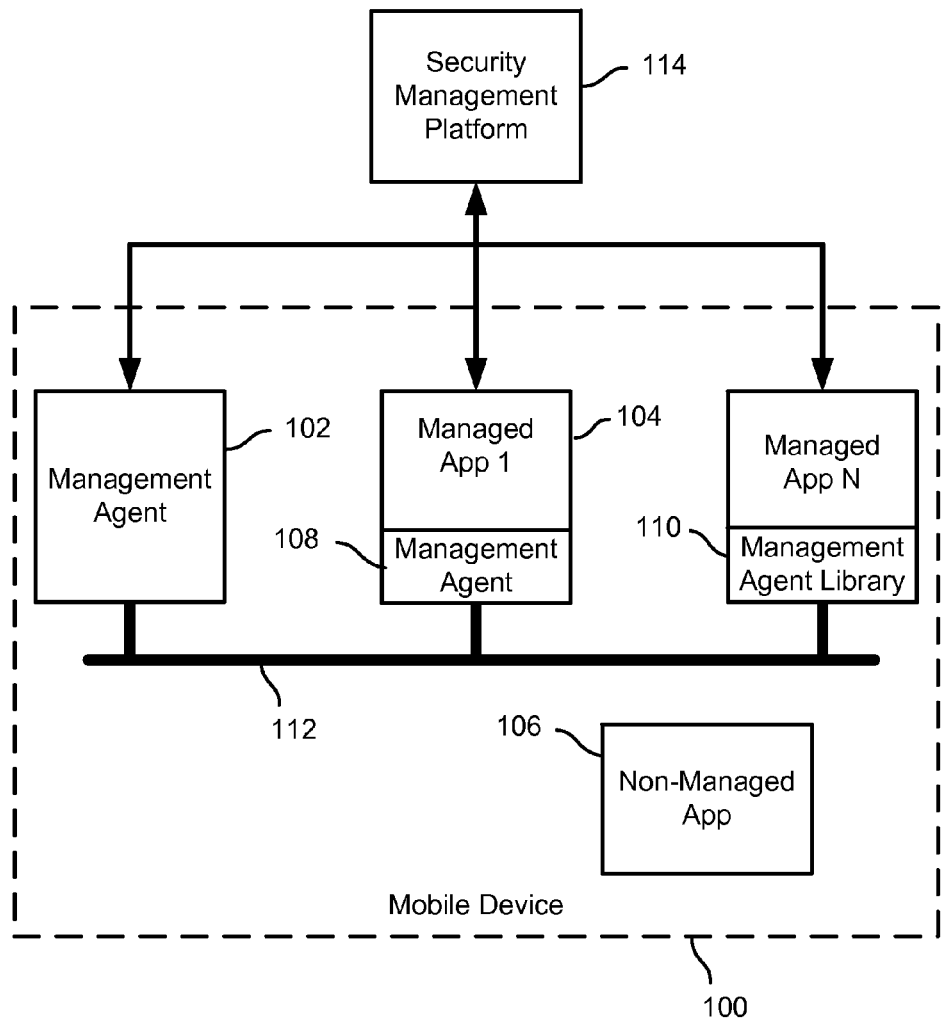
FIG. 1 is a block diagram illustrating an embodiment of a system including distributed management agents.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Distributed mobile device management including a plurality of management agents is disclosed. In various embodiments, a mobile device management (MDM) system may include multiple management agents that cooperatively provide the functionality of a management agent application. In some embodiments, at least one of the management agents may be associated with a managed application. For example, a management agent may be included in a library associated with an application, included in a software development kit (SDK) associated with an application, injected into an application, added to an application by wrapping, and/or otherwise associated with an application.

According to various embodiments, management-related information may be retrieved from a storage location accessible to a plurality of management agents. The management-related information may have been provided to the storage location from a management agent associated with a managed application. And at least one operation may be performed based at least in part on the management-related information.

FIG. 1 is a block diagram illustrating an embodiment of a system including distributed management agents. In the example shown, a mobile device 100 (e.g., smartphone, tablet, etc.) may include management agent application(s) 102 (e.g., standalone management agent(s), MDM agent(s)), managed application(s) 104 (e.g., managed client application(s)), non-managed application(s) 106 (e.g., non-authorized application(s), untrusted application(s)), and/or other applications. In some embodiments, a mobile device 100 may include one or more management agents 108 (e.g., embedded management agents) each associated with a managed application 104.

In various embodiments, the management agent(s) 108 may, for example, include a management agent library 110 associated with a managed application 104. A management agent library 110 may include, for example, a software development kit (SDK) associated with a managed application 104, code added to binary code associated with the managed application 104 (e.g., a modified version of the managed application binary), and/or other information associated with a managed application 104. For example, a management agent library 110 may be embedded into a managed application 104 generated by an enterprise (e.g., added to the application code during development). In another example, application binary associated with a third party managed application 104 may be wrapped and/or otherwise modified to include a management agent library 110 (e.g., after development by the third party).

According to some embodiments, the management agent(s) 102, managed applications 104, management agents 108, and/or other components may be components of an MDM system. The management agent 102, managed applications 104, management agents 108, and/or other components may be configured to share information/data in a trusted manner via a secure mobile application connection bus 112 (e.g., secure inter-application connection bus, secure application command bus, secure application communication bus, etc.). For example, information may be shared in a trusted manner among management agents 102, 108 authorized to access the secure connection bus 112. In some embodiments, management agents 102, 108 may share (e.g., transfer, provide) management-related information with other management agents 102, 108 using the secure mobile application connection bus 112.

In some embodiments, data may be transferred in a trusted manner among applications authorized to have access to the secure mobile application connection bus 112 by storing the data in an encrypted form in a data storage location (e.g., a paste board, shared keychain location, and/or other storage), which is accessible to the entities authorized to communicate via the bus 112. In various embodiments, data may be transferred in a trusted manner from a first management agent (e.g., the management agent 108) to a second management agent (e.g., management agent 102, another management agent 108) authorized to have access to the secure mobile application connection bus 112 by calling a uniform resource locator (URL) scheme associated with the second management agent (e.g., a URL scheme associate with a managed application that is associated with the management agent) including the encrypted data.

In various embodiments, a security management platform 114 (e.g., a virtual smartphone platform, security management server, management server, etc.) manages configuration(s), polic(ies), and/or settings associated with the mobile device 100. The security management platform 114 may manage (e.g., control, dictate, determine) the configurations, policies, settings, and/or other functional aspects of one or more of the managed applications 104 on the mobile device 100. For example, the security management platform 114 may communicate with managed applications 104 using one or more management agents 102, 108 as intermediar(ies).

In some embodiments, management agents 102, 108 may each connect to (e.g., establish a connection with) the security management platform 114 to upload management-related information (e.g., management state information, task state/status information), application configuration information, and/or other types of information. In various embodiments, management agents 102, 108 may connect with the security management platform 114 to download managed application information (e.g., lists of managed applications 104), application code (e.g., application binaries), managed application policies, configuration information, and/or any other information. For example, configuration changes, policy updates, setting changes, and/or commands related to the managed applications 104 may be pushed to management agents 102, 108 for secure distribution to the applications 104. In some embodiments, management agents 102, 108 may, for example, connect to the security management platform 114 (e.g., on a periodic basis) to register the device with security management platform 114, update the device 100 status, retrieve policy information, retrieve configuration information, and/or perform other operations. These are a few examples of operations performed by the management agents 102, 108 in conjunction with the security management platform 114; however, many other types of operations may be performed.

In some embodiments, multiple management agents 102, 108 may operate in conjunction with one another (e.g., cooperatively) to perform any of the operations, functions, and/or tasks required of an MDM management agent (e.g., management-related operations). For example, a first management agent 102, 108 may begin a task, and in the event the first management agent does not complete the task a second management agent 102, 108 may continue the task. In some embodiments, management agents 102, 108 may share management state information to ensure that one management agent 102, 108 is not duplicating the work of another management agent 102, 108. For example, management state information may be shared to ensure two management agents 102, 108 are not executing the same task at the same time. In this way, multiple management agents 102, 108 may collaboratively and efficiently complete management-related operations on the mobile device 100.

Figure 2:
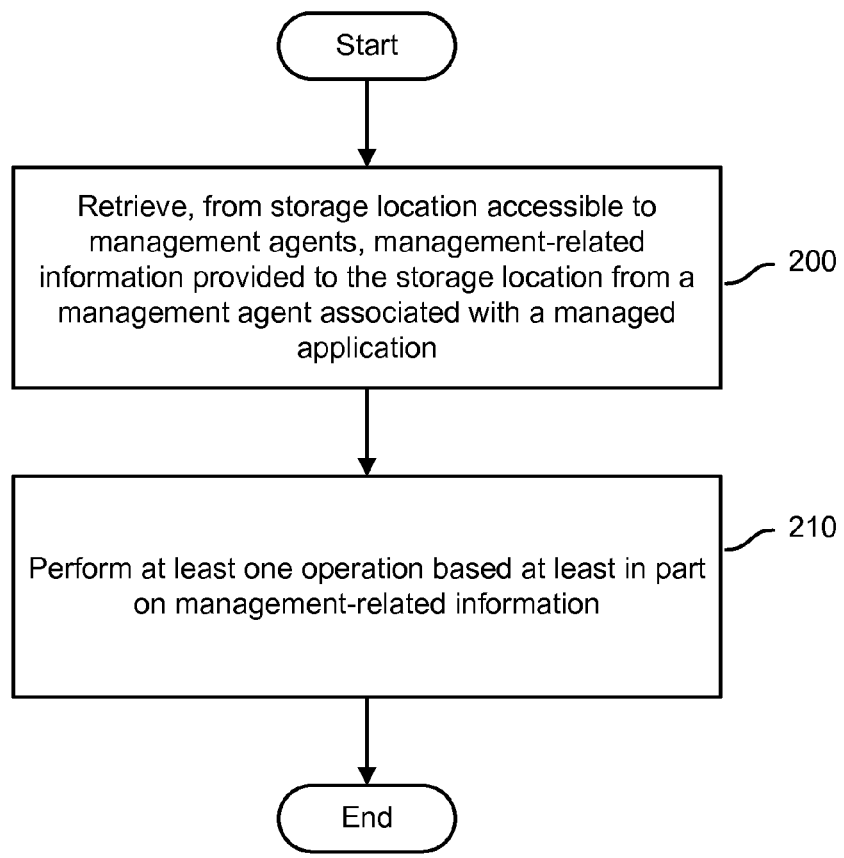
FIG. 2 is a flowchart illustrating embodiments of a process of distributed mobile device management.

FIG. 2 is a flowchart illustrating embodiments of a process of distributed mobile device management. In various embodiments, the process is performed by the system 100 of FIG. 1. At 200, management-related information may be retrieved from a storage location accessible to two or more management agents. The management-related information may have been provided to the storage location from a management agent associated with a managed application. In various embodiments, the management-related information may be retrieved at a management agent (e.g., a different management agent than the management agent that provided the management-related information to the storage location). The management agent may include, for example, a management agent application (e.g., management agent 102 of FIG. 1, a standalone management agent), a management agent associated with a managed application (e.g., management agent 108 of FIG. 1), a management agent library associated with a managed application (e.g., management agent library 110 of FIG. 1), and/or any other management agent.

In various embodiments, management-related information may include management state/status information, operation/task information, and/or any information related to management of the mobile device. The management-related information may be shared among multiple management agents on a mobile device. The management-related information may include, for example, session information, security authentication status, security authorization status, and/or any other information associated with management agents, managed applications, and/or other mobile device components. The management-related information may include, for example, management-related operations (e.g., application configuration, registration, update, and/or other operations), states/statuses associated with management-related operations (e.g., a pending state, partially completed state, completed, and/or other state/status associated with an operation), states/statuses associated with management agents on the device, and/or other management-related information.

In various embodiments, management-related information may include management state information. The management state information may, for example, include information that allows a management agent to continue operations/tasks started (e.g., partially completed) by other management agent(s). For example, a management agent may begin performing an operation (e.g., updating a configuration associated with a managed application and/or any other operation) and may bay interrupted (e.g., closed, moved to the background) prior to completing the operation. Upon interruption, the management agent may generate/update management state information to indicate a current state of the operation, and provide the management state information to a shared storage location. Later, another management agent may retrieve the management state information from the shared storage location and may be able to, based at least in part on the management state information, continue the operation from where the previous management agent left off.

At 210, at least one operation may be performed based at least in part on the management-related information. In some embodiments, a management agent (e.g., associated with a managed application) may determine at least one operation based on the management-related information. For example, the management-related information may indicate that one or more management-related operations are pending (e.g., have not been completed, have been partially completed, etc.). The management agent may based on, for example, the management-related information indicating that management-related operations are pending, continue execution of the managed related operations.

Figure 3:
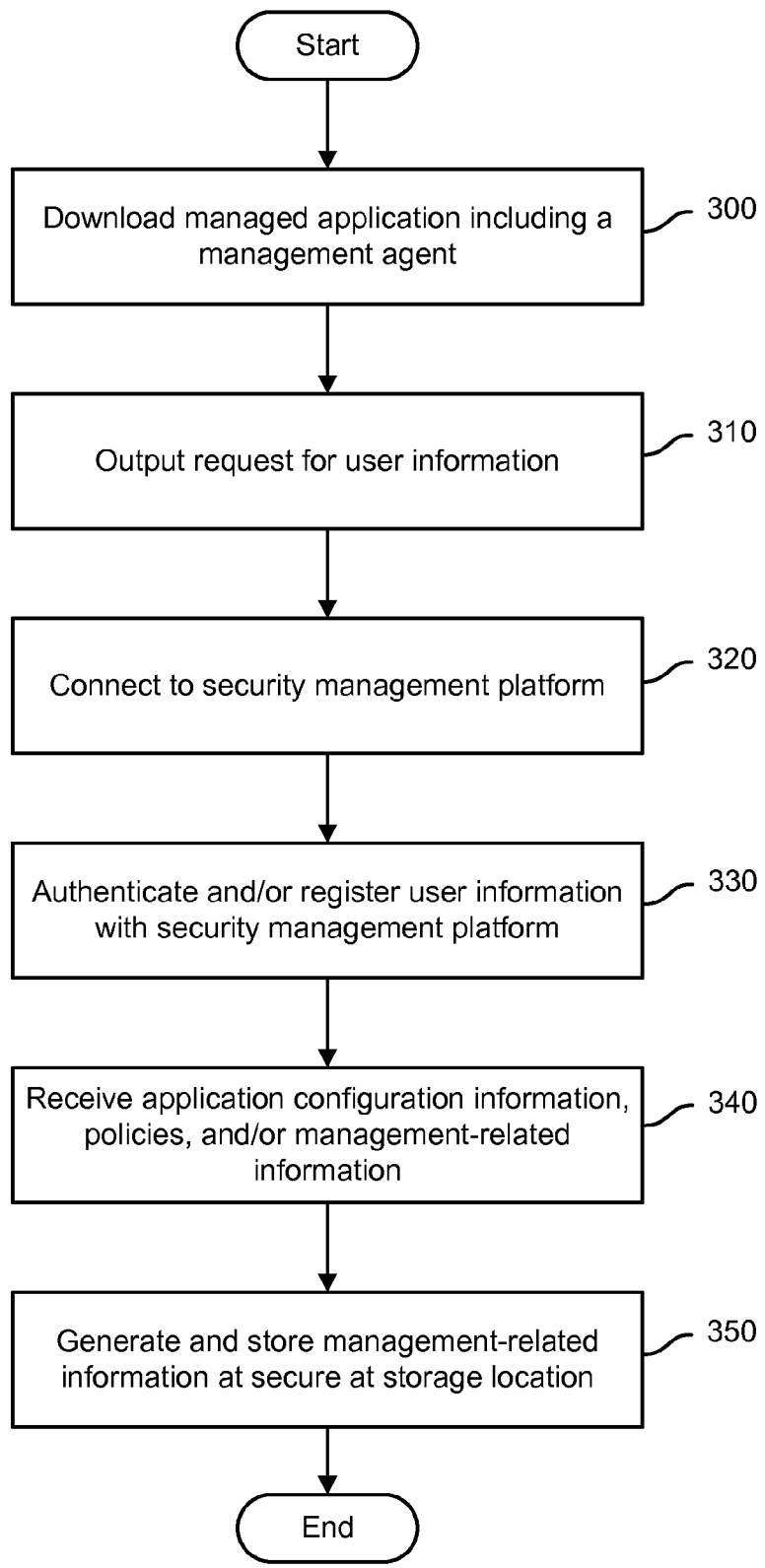
FIG. 3 is a flowchart illustrating embodiments of a mobile device registration process using multiple management agents.

FIG. 3 is a flowchart illustrating embodiments of a mobile device registration process using multiple management agents. In various embodiments, the process is performed by the system 100 of FIG. 1. At 300, a managed application including a management agent may be downloaded. In various embodiments, the managed application including the management agent may be downloaded to a mobile device managed within an MDM architecture. For example, the managed application may be a first application downloaded to the mobile device including a management agent. Prior to the download, no management agent may have been installed on the mobile device.

At 310, a request may be output for user information. In various embodiments, the management agent associated the managed application may initiate a registration process by requesting user information, managed server information, and/or other registration information. For example, the management agent may output a request for user information including user credentials (e.g., username, password, security question, etc.), identification information (e.g., name, job title, department), and/or other user information.

At 320, the management agent may connect to a security management platform. In some embodiments, the management agent may establish a connection with a security management platform to register, configure, and/or otherwise initialize the mobile device and/or managed applications for management in an MDM architecture. In certain cases, management server connection information including, for example, how to locate and/or communicate with the management server may be included in the management agent (e.g., during development of the agent). The management agent associated with managed application may use this information to establish a connection with the security management platform.

At 330, user information may be authenticated and/or registered with the security management platform. In various embodiments, the management agent may provide the user information to the security management platform for authentication. For example, the security management platform may compare the user information from the management agent to a repository (e.g., database) of user information. The user information may be authenticated based at least in part on the comparison. In various embodiments, the user information provided by the management agent may be associated with a previously un-registered user, and the security management platform may register the user based on the user information.

At 340, application configuration information, policies, and/or management-related information may be received. In various embodiments, the security management platform may provide (e.g., push) application configuration information, policies, operations, tasks, and/or management-related information to the management agent. For example, the application configuration information, policies, operations, tasks, and/or management-related information may be used by the management agent to configure, update, and/or perform other operations related to the applications.

At 350, management-related information may be generated and stored at a storage location. In various embodiments, the management agent may generate management state information and store the management state information to a secure application connection bus. For example, the management agent may generate a management state section (e.g., file, folder, partition, etc.) on the secure application connection bus (e.g., a data storage location). The management state information may be retrieved and/or updated by multiple management agents during use of the mobile device. For example, the management state information may be retrieved, read, and/or updated each time a management agent becomes active on the mobile device.

Figure 4:
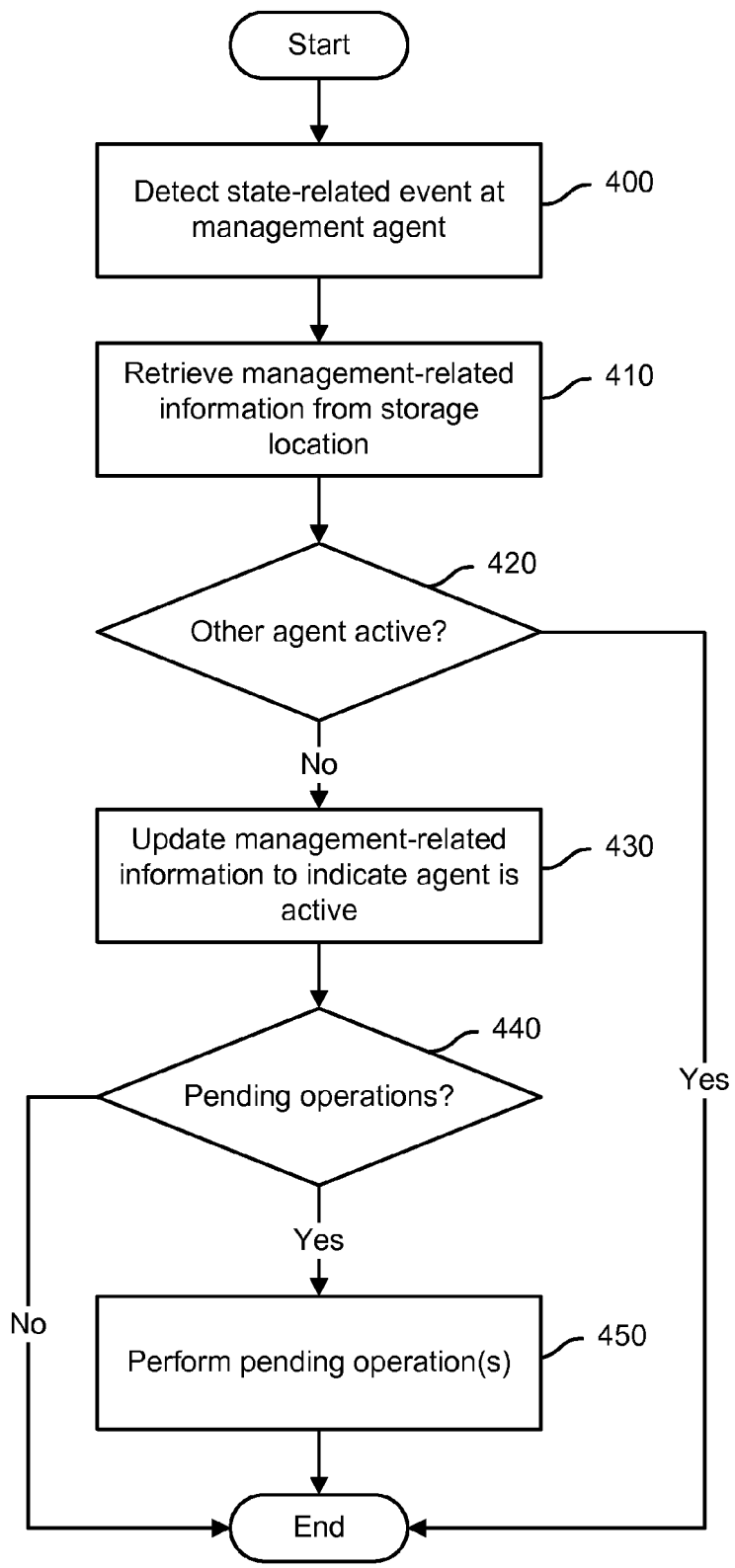
FIG. 4 is a flowchart illustrating embodiments of a process of distributed mobile device management.

FIG. 4 is a flowchart illustrating embodiments of a process of distributed mobile device management. In various embodiments, the process is performed by the system 100 of FIG. 1. At 400, a state-related event may be detected at a management agent associated with a managed application. In various embodiments, a state-related event may include any event associated with the state of a managed application with which a management agent is associated. For example, states associated with an application may include foreground (e.g., application is active an receiving events), active (e.g., application running in foreground and receiving events), inactive (e.g., in foreground but not currently receiving events), background (e.g., in background and executing code, transitioning from foreground to suspended), suspended (e.g., application is in the background and is not executing code, remains in memory but does not execute any code), not running (e.g., application is not launched, terminated, killed, etc.), and/or any other state associated with an application. A state-related event associated with a managed application may occur when the application changes state. For example, a state-related event may occur when an application moves to the foreground (e.g., becomes active).

In various embodiments, a state-related event associated with a managed application may be detected by a management agent associated with the managed application.

At 410, management-related information may be retrieved from a storage location. In various embodiments, a management agent associated with a managed application may retrieve management-related information from a storage location accessible to a plurality of management agents included on a mobile device. The management-related information may include, for example, management state information.

At 420, the management agent may determine whether any other management agent(s) are active. In various embodiments, management state information may include information indicating whether a management agent is active (e.g., performing operations on the device). In some embodiments, only one management agent may be allowed to be active at one time. This policy and/or rule may be defined by, for example, the security management platform and/or other node. In certain cases, only allowing one management agent to perform an operation at a time may reduce the likelihood of data processing collisions, duplicate execution of tasks, and/or other events from occurring. By way of example, one management agent may have (e.g., establish, claim) ownership of the management state associated with the mobile device. The owner management agent may set a management state information (e.g., associated with the mobile device, an operation, etc.) to "locked" so that other management agents do not interfere with execution of operations.

In various embodiments, multiple management agents may be allowed to be active at a time. For example, one management agent may serve a master management agent role and may manage task being performed by other management agents. Techniques in which multiple management agents are simultaneously active are discussed in detail below.

In the event that it is determined (e.g., by the management agent) that another management agent is active, the process may end. For example, the management agent may transition to an inactive state until, for example, other active management agents are no longer active and/or another event occurs causing the management agent to become active. In the event it is determined (e.g., by the management agent) that no other management agents are active, the process may proceed to step 430.

At 430, the management-related information may be updated to indicate that the management agent is active. In some embodiments, the management agent may update management state information (e.g., included in the management-related information) to take ownership of a management state associated with a plurality of management agents. For example, the management agent may set a management state section (e.g., included in the management state information) to locked, active, and/or other another state. In some cases, other management agents (e.g., that become active) will be restricted from performing operations.

At 440, the management agent may determine whether operation(s) are pending. In various embodiments, the management agent may determine based on the management state information whether any management-related operations are pending. A management-related operation may be pending, for example, if the operation has not yet been performed/executed, has been partially performed/executed, and/or is otherwise yet to be executed. For example, a management-related operation may be pending when an operation is started by a management agent but not completed. In another example, a management-related operation may be pending if a command has been provided to the mobile device (e.g., to a management agent) from a security management platform but has not yet been performed.

In the event that the management state information indicates that a management-related operation is pending, the process may proceed to step 450. In the event, no management-related operations are pending the process may end. For example, the management agent may be suspended (e.g., may wait) until, for example, a command is received from the security management platform and/or other event(s) occur.

At 450, the management agent may perform one or more pending operations. In some embodiments, the management-related information may include one or more pending operations (e.g., a list of pending operations). In certain cases, the pending operations may be associated with an order (e.g., based on importance, time, etc.) in the management-related information, and the management agent may select an operation based at least in part on the order. For example, the management agent may continue execution of a partially complete operation (e.g., an operation partially completed by another management agent).

In various embodiments, the management agent may execute operations in conjunction with a security management platform (e.g., a management server). Management agents may, for example, execute operations received from the security management platform. For example, the management agent may retrieve information from and/or provide information to the security management platform to execute an operation. For example, an operation may include updating configuration(s) of managed applications. To execute the operation, the management agent may connect with the security management platform to retrieve configuration information associated with the managed applications.

In some embodiments, multiple management agents may effectively function as a single management agent. According to some embodiments, multiple management agents may be associated with a same identifier (e.g., management agent identity). For example, all management agents on a mobile device (e.g., including management agent application and/or management agents associated with managed applications) may be associated with a same identifier (e.g., identity). In various embodiments, a management agent identifier may include a global unique identifier. The global unique identifier may, for example, be derived from an identifier provided by a mobile device operating system. The unique identifier may include, for example, an international mobile state equipment identity (IMEI), media access control (MAC) address, and/or other identifier including management domain information. Because each management agent may be associated with the same identity (e.g., identifier), the security management platform may switch between management agents without sending and/or receiving duplicate information.

In various embodiments, from the perspective of the security management platform, multiple management agents on a device may operate as a single management agent, and the security management platform may not be aware that multiple management agents are installed on the device. In certain cases, no configuration changes need to be made at the security management platform to support (e.g., interface with) multiple management agents on a mobile device. For example, a security management platform may seamlessly manage a first mobile device including a single management agent and a second mobile device including multiple management agents without substantial configuration changes (e.g., any configuration changes).

Figure 5:
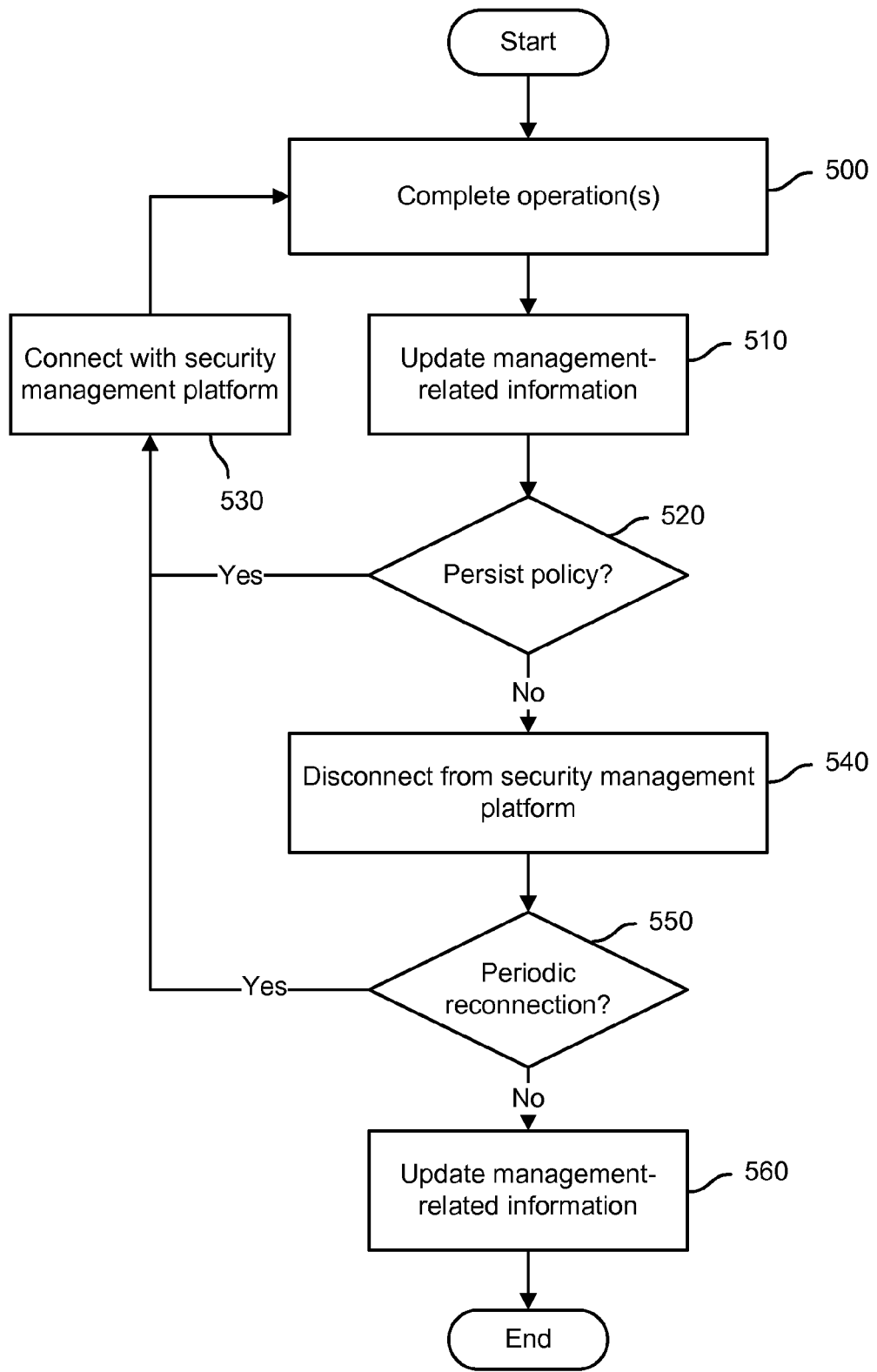
FIG. 5 is a flowchart illustrating embodiments of a process of distributed mobile device management.

FIG. 5 is a flowchart illustrating embodiments of a process of distributed mobile device management. In various embodiments, the process is performed by the system 100 of FIG. 1. At 500, a management agent may complete an operation. In various embodiments, a management agent associated with managed application may complete one or more management-related operations included, for example, in the management-related information. In some embodiments, a management agent may complete management-related operations provided to the management agent from a security management platform and/or other node.

At 510, management-related information may be updated. In various embodiments, the management agent may generate updated management-related information (e.g., management state information) indicating that operation(s) have been completed. For example, a management agent may determine that all operations included in the management-related information are completed, and the management agent may update the management-related information to indicate that all operations (e.g., all pending operations) are complete. The updated management-related information may be provided to a storage location accessible to other management agents on a mobile device.

At 520, it may be determined whether a persist policy is applicable to the management agent(s). In various embodiments, management agents may be configured to persist a connection with the security management platform after completion of management-related operations. For example, management agents may be configured to persist (e.g., maintain) a connection with the security management platform when no operations are pending (e.g., when there is nothing to do). Persisting the connection may, for example, allow the management agents to quickly perform any operations provided by the security management platform. In the event the management agent(s) are configured to persist (e.g., maintain) a connection with the security management platform, the process may proceed to step 530. In the event the management agent(s) are not configured to persist (e.g., maintain) a connection with the security management platform, the process may proceed to step 540.

At 530, the management agent may connect to the security management platform. In various embodiments, management agents associated with managed applications may persist (e.g., maintain) a connection with the security management platform. In some embodiments, management agents may be configured such that at least one management agent is connected to the security management platform. In one example, a management agent operating in the foreground (e.g., associated with a managed application that is active (in the foreground)) may be configured to connect and/or maintain a connection with the security management platform even when the management agent is not executing operations. In certain cases, multiple management agents may be configured such that whichever management agent is operating is active (e.g., is in ownership of the management agent state) connects to and/or persists a connection to the security management platform.

At 540, a management agent may disconnect from the security management platform. In various embodiments, management agents may be configured to disconnect from the security management platform when no management-related operations are pending and/or being performed. For example, the management agents may disconnect from the security management platform by ending a session with the security management platform. Upon disconnection, the management agents may, for example, cease sending information to the security management platform (e.g., temporarily).

At 550, it may be determined whether the management agents are to periodically connect to the security management platform. In some embodiments, management agents may be configured to periodically connect to the security management platform. For example, management agents may be configured to connect to the security management platform at intervals (e.g., a connection interval) including, for example, every five minutes, hour, day, and/or after any other period of time. In various embodiments, the management-related information may include connection interval information (e.g., periodic connection interval information) including, for example, a threshold period of time, an interval, and/or other period-related information. In certain cases, management agents may be configured to connect with the security management platform if a threshold time has been exceeded. For example, a management agent may determine that a time of last connection between management agents and the security management platform exceeds a threshold time period. Based on this determination, the process may proceed to step 530, and a management agent may connect to the security management platform. In the event the management agents are not configured to periodically reconnect to the security management platform, the process may proceed to step 560.

At 560, the management-related information may be updated. In various embodiments, management state information may be updated to indicate that the management agent is disconnected from the security management platform, is transitioning to the background, and/or is in another state. For example, the management agent may update the management state information to indicate that the management agent is no longer active (e.g., to remove a lock). Based on the management state information indicating that no management agent is active, another management agent may be able to become active and/or communicate with the security management platform.

Figure 6:
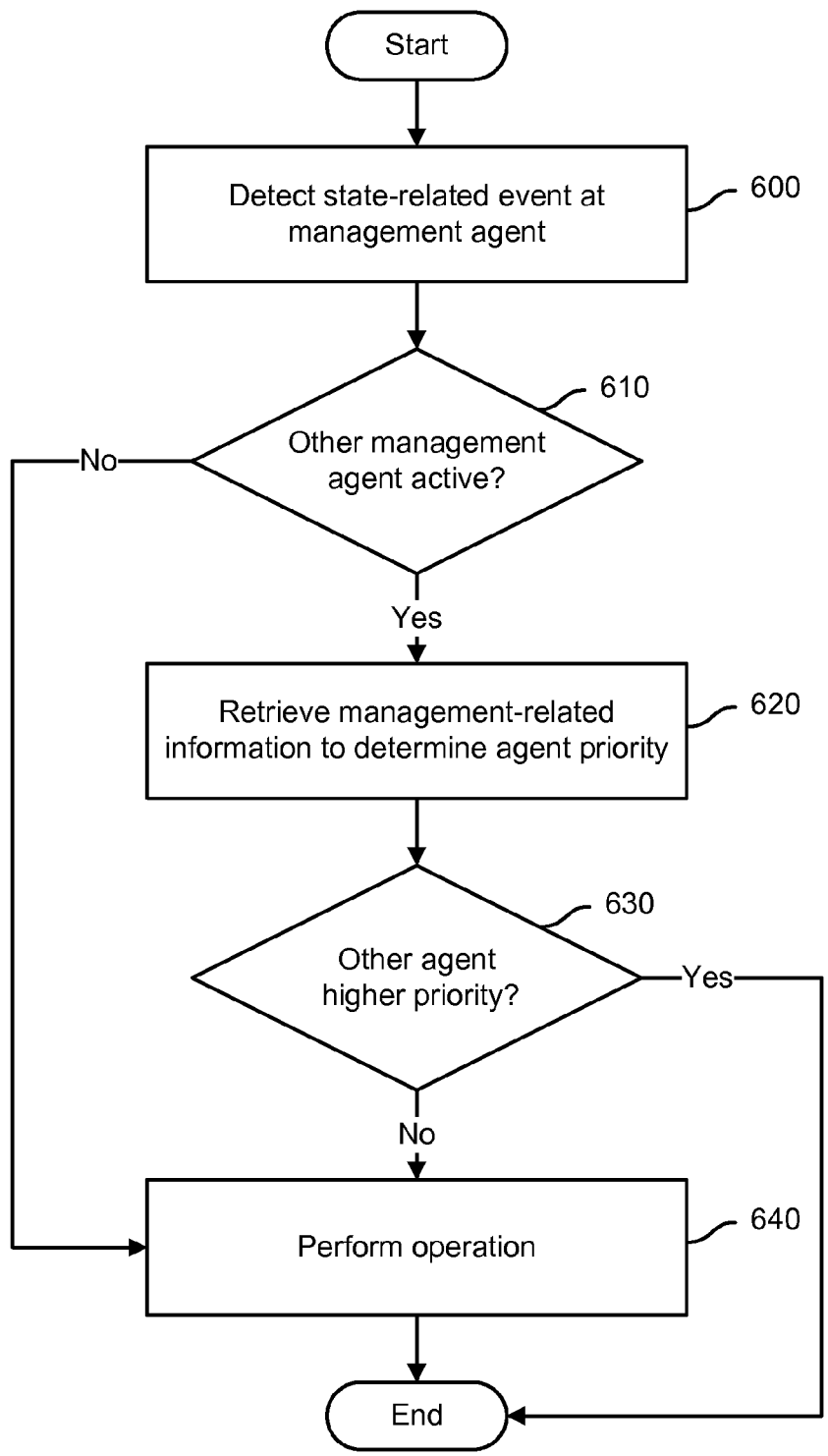
FIG. 6 is a flowchart illustrating embodiments of a process of determining priority amongst management agents.

FIG. 6 is a flowchart illustrating embodiments of a process of determining priority amongst management agents. In various embodiments, the process is performed by the system 100 of FIG. 1. At 600, a state-related event may be detected at a management agent. In various embodiments, a management application associated with a management agent may transition from an inactive state to an active state, and this transition (e.g., a state-related event) may be detected by the management agent. For example, a management agent associated with a managed application may be activated when the managed application is activated (e.g., when the managed application is opened and/or any other state-related event occurs).

In some embodiments, state-related events (e.g., a transition to the foreground) may be detected at multiple managed applications. For example, certain mobile device operating systems may allow multiple applications to run in the background, foreground, and/or other state. In certain cases, two managed applications each including management agents may become active (e.g., transition to the foreground, change state) at substantially the same time, and the transitions may be detected by each of the management agents.

At 610, it may be determined whether other management agents are active. In some embodiments, it may be determined, by a management agent (e.g., associated with a managed application) transitioning to an active state, whether any other management agents are currently performing operations. For example, a management agent may determine whether other management agents are performing operations based on management state information. The management state information may, for example, include state information associated with management agents indicating whether any other management agents are active (e.g., performing/executing operations). In various embodiments, the security management platform may determine whether other management agents are active on the device (e.g., whether multiple management agents are active).

In the event it is determined that no other management agents are active, the process may proceed to step 640. In the event it is determined that other management agent(s) are active, the process may proceed to step 620.

At 620, management-related information may be retrieved to determine management agent priority. In various embodiments, management-related information may include information defining a priority, ranking, and/or hierarchy of multiple management agents. The priority, hierarchy, and/or ranking of management agents may, for example, be defined by a user (e.g., an administrator at the security management platform, the mobile device user). For example, one management agent may be deemed a master management agent (e.g., high priority management agent). In one example, the master management agent may include a management agent application (e.g., a standalone management agent application), while management agents associated with managed applications may be lower priority management agents.

In some embodiments, the management-related information may include a data structure (e.g., list) including management agents and a priority associated with each management agent. For example, each management agent may be designated as master agent, slave agent, high priority agent, low priority agent, and/or another designation.

At 630, it may be determined whether another active agent is a higher priority agent. In various embodiments, a management agent (e.g., associated with a managed application) may determine whether any other higher priority agents are active (e.g., performing management-related operations). In certain cases, only one management agent may be active (e.g., performing an operation) at a time. And priority information included in the management-related information may be used to determine which application should become the active management agent. For example, a management agent associated with a low priority may determine that a management agent associated with a higher priority is active. Based on this determination, the lower priority management agent would not become active and may remain in a background, inactive, standby, and/or other state. In this case, the process may end.

In various embodiments, one management agent may be deemed a master management agent (e.g., assume a master agent role). A management agent may be deemed a master management agent based on, for example, user input (e.g., administrator input at the security management platform), the management agent's capabilities (e.g., one management agent may be configured to perform more operations than other agents), and/or other factors. The management-related information may include information indicating that the management agent is a master management agent. In the event another management agent (e.g., a non-master agent) attempts to become active, that other management agent may check the management-related information and determine that the master management agent is a higher priority management agent. In this case, the other (e.g., non-master agent) may not become active (e.g., may remain suspended) and/or may communicate with the master management agent to, for example, receive (e.g., be delegated) operations for execution.

In some embodiments, two or more management agents may be attempting to transition to an active state at substantially the same time. The management agents (e.g., a higher priority agent and lower priority agent) may each (e.g., independently) retrieve management-related information. A higher priority management agent may determine that no other higher priority agents are active and may become active. The lower priority agent may determine that the higher priority agent is active and/or transitioning to an active state. And, based on this determination, the lower priority management agent may remain inactive.

In the event a management agent determines that a higher priority agent is active and/or transitioning to an active state, the process may end. In the event a management agent determines that no higher priority management agents are active and/or transition to an active state, the process may proceed to step 640.

At 640, a management agent may execute an operation. For example, the management agent may execute any of the management-related operations discussed herein.

Figure 7:
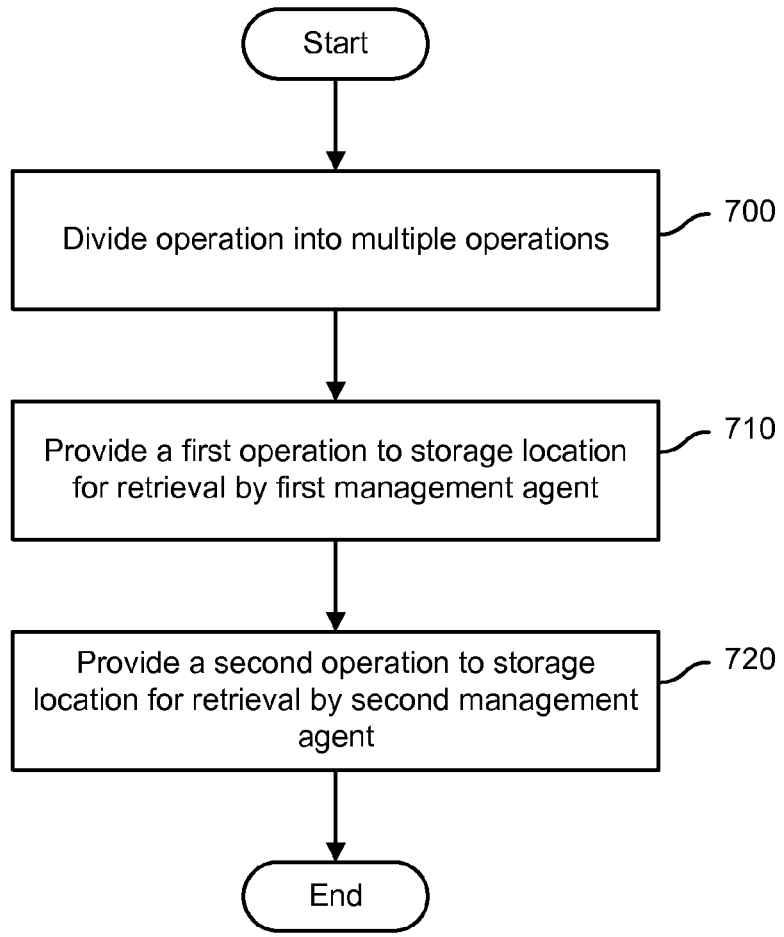
FIG. 7 is a flowchart illustrating embodiments of a process of delegating operations amongst multiple management agents.

FIG. 7 is a flowchart illustrating embodiments of a process of delegating operations amongst multiple management agents. In various embodiments, the process is performed by the system 100 of FIG. 1. At 700, an operation may be divided into multiple operations. In some embodiments, a management-related operation may be divided into multiple operations (e.g., sub-operations) by, for example, a security management platform, a management agent, and/or another node. For example, a management-related operation to update the configuration associated with a set of applications may be divided into multiple operations. For example, a first operation may include updating the configuration(s) of a first subset of the applications, a second operation may include updating the configuration(s) of a second subset of the applications, and so on.

At 710, a first operation may be provided to a storage location for retrieval at a first management agent. In various embodiments, a management agent (e.g., master management agent), security management platform, and/or other node may provide a first operation (e.g., a sub-operation of a larger task) to a storage location accessible to a first management agent. For example, management-related information may be generated including the first operation, and the management-related information may be provided to a storage location for retrieval by the first management agent. In some embodiments, the first management agent may be invoked using, for example, a URL scheme call including first operation instructions. In certain cases, the first management agent may be invoked using, for example, a URL scheme call instructing the first management agent to retrieve the first operation from the storage location (e.g., secure application connection bus).

At 720, a first operation may be provided to a storage location for retrieval at a first management agent. In various embodiments, a management agent (e.g., master management agent), security management platform, and/or other node may provide a second operation (e.g., a sub-operation of a larger task) to a storage location accessible to a second management agent. For example, management-related information may be generated including the second operation, and the management-related information may be provided to a storage location for retrieval by the second application.

In various embodiments, multiple management agents (e.g., the first, second, and possible other management agents) may perform one or more sub-operations of an operation in parallel. For example, an operation to update the managed applications on a mobile device may be divided into multiple sub-operations and these sub-operations may be each executed (e.g., in parallel) by separate management agents. In some embodiments, the management agents may each update the management-related information so that only one management agent is performing an operation at a time. Multiple separate operations may, however, be performed substantially simultaneously, in parallel, and/or at the same time.

The techniques disclosed herein provide a distributed management of a mobile device using multiple management agents.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
retrieving, from a storage location by a first management agent on a mobile device, management-related information provided to the storage location by a second management agent on the mobile device, wherein the first management agent and the second management agent are configured to communicate with a security management platform, and wherein the storage location to which the management-related information is provided includes a secure connection bus that is not accessible to applications on the mobile device that are not authorized to access the secure connection bus; and performing, by the first management agent, at least one mobile device management operation based at least in part on the management-related information, wherein the management operation includes an operation partially performed by the second management agent.

2. The method of claim 1, wherein the storage location comprises a secure storage location accessible to a plurality of managements on the mobile device.

3. The method of claim 1, wherein one or more of first management agent and the second management agent comprises a standalone management agent.

4. The method of claim 1, wherein one or more of first management agent and the second management agent is associated with a managed application.

5. The method of claim 1, wherein one or more of first management agent and the second management agent comprises a library associated with a managed application.

6. The method of claim 1, wherein the management-related information includes one or more of: management state information, session information, a security authentication state, a security authorization state, and a management agent state.

7. The method of claim 1, wherein the first management agent and the second management agent are each associated with a same identifier.

8. The method of claim 1, wherein the retrieving step comprises:
detecting a state-related event at the first management agent;
retrieving, at least in part in response to the state-related event, the management-related information from the storage location.

9. The method of claim 1, wherein the performing step comprises:
determining, based at least in part on the management-related information, that the management operation is pending; and
performing at least a portion of the pending operation.

10. The method of claim 1, further comprising:
determining, at the first management agent, that the operation has been performed;
generating updated management-related information including an indication that the operation has been performed; and
providing the updated management-related information to the storage location.

11. The method of claim 1, further comprising:
determining, based at least in part on the management-related information, that no operations are pending; and
maintaining a connection between a management agent and a security management platform.

12. The method of claim 1, further comprising:
determining, at the first management agent, that a time of last connection between at least one management agent and a security management platform exceeds a threshold; and
connecting with the security management platform.

13. The method of claim 1, further comprising:
determining, at the first management agent based at least in part on the management-related information, that no other management agent is active;
generating updated management-related information to indicate that the first management agent is active; and
providing the updated management-related information to the storage location.

14. The method of claim 1, wherein performing the at least one operation includes:
determining, at the first management agent, based at least in part on the management-related information, that at least one other management agent is active; and
transitioning the first management agent to an inactive state.

15. The method of claim 1, further comprising:
determining, at the first management agent based at least in part on the management-related information, that an other application active on a mobile device is a higher priority application; and
transitioning the first management agent to an inactive state.

16. The method of claim 1, wherein performing the at least one operation includes:
dividing the operation into a plurality of operations;
providing a first operation included in the plurality of operations to the storage location to be retrieved by a third management agent; and
providing a second operation included in the plurality of operations to the storage location to be retrieved by a fourth management agent.

17. The method of claim 1, further comprising:
downloading the first management;
receiving, at the first management agent, user information; and
connecting to a security management platform authenticate the user information.

18. The method of claim 1, further comprising:
generating the management-related information comprising management state information; and
providing the management state information to a management state section included in the storage location.

19. A system, comprising:
a processor; and
a memory coupled with the processor, wherein the memory is configured to provide the processor with instructions which when executed cause the processor to:
retrieve, from a storage location by a first management agent on a mobile device, management-related information provided to the storage location by a second management agent on the mobile device, wherein the first management agent and the second management agent are configured to communicate with a security management platform, and wherein the storage location to which the management-related information is provided includes a secure connection bus that is not accessible to applications on the mobile device that are not authorized to access the secure connection bus; and
perform, by the first management agent, at least one mobile device management operation based at least in part on the management-related information, wherein the management operation includes an operation partially performed by the second management agent.

20. A computer program product, the computer program product being embodied in a tangible non-transitory computer readable storage medium and comprising computer instructions for:
retrieving, from a storage location by a first management agent on a mobile device, management-related information provided to the storage location by a second management agent on the mobile device, wherein the first management agent and the second management agent are configured to communicate with a security management platform, and wherein the storage location to which the management-related information is provided includes a secure connection bus that is not accessible to applications on the mobile device that are not authorized to access the secure connection bus; and performing, by the first management agent, at least one mobile device management operation based at least in part on the management-related information, wherein the management operation includes an operation partially performed by the second management agent.

\* \* \* \* \*